United States Patent
Wray et al.

(10) Patent No.: US 11,036,561 B2
(45) Date of Patent: Jun. 15, 2021

(54) DETECTING DEVICE UTILIZATION IMBALANCES

(71) Applicant: Oracle International Corporation, Redwood Shores, CA (US)

(72) Inventors: Stuart Wray, Cambridge (GB); Felix Schmidt, Niederweningen (CH); Craig Robert Schelp, Surrey (CA); Manel Fernandez Gomez, Barcelona (ES); Nipun Agarwal, Saratoga, CA (US)

(73) Assignee: Oracle International Corporation, Redwood Shores, CA (US)

( * ) Notice: Subject to any disclaimer, the term of this patent is extended or adjusted under 35 U.S.C. 154(b) by 236 days.

(21) Appl. No.: 16/044,230

(22) Filed: Jul. 24, 2018

(65) Prior Publication Data

US 2020/0034208 A1    Jan. 30, 2020

(51) Int. Cl.
  *G06F 9/50* (2006.01)
  *H04L 12/803* (2013.01)
  *H04L 12/26* (2006.01)

(52) U.S. Cl.
  CPC ........ *G06F 9/5083* (2013.01); *H04L 43/0882* (2013.01); *H04L 43/106* (2013.01); *H04L 47/125* (2013.01)

(58) Field of Classification Search
  CPC . G06F 9/5083; H04L 47/125; H04L 43/0882; H04L 43/106
  See application file for complete search history.

(56) References Cited

U.S. PATENT DOCUMENTS

| | | | | |
|---|---|---|---|---|
| 2004/0196971 | A1* | 10/2004 | Disch | H04K 1/06 380/36 |
| 2015/0100579 | A1* | 4/2015 | Oba | H04L 41/0853 707/737 |
| 2018/0212849 | A1* | 7/2018 | Hobgood | H04L 61/1511 |
| 2019/0279103 | A1* | 9/2019 | Rangan | G06F 16/93 |

FOREIGN PATENT DOCUMENTS

CN    106650505 A  *  5/2017  ............. G06F 21/71

OTHER PUBLICATIONS

Przemyslaw Berezinski et al., "An Entropy-Based Network Anomaly Detection Method", Entropy, 2015, 17, 2367-2408; doi:10.3390/e17042367, pp. 2367-2408.*

* cited by examiner

*Primary Examiner* — Alexander Satanovsky
(74) *Attorney, Agent, or Firm* — Hickman Becker Bingham Ledesma LLP

(57) ABSTRACT

Embodiments monitor statistics from groups of devices and generate an alarm upon detecting a utilization imbalance that is beyond a threshold. Particular balance statistics are periodically sampled, over a timeframe, for a group of devices configured to have balanced utilization. The devices are ranked at every data collection timestamp based on the gathered device statistics. The numbers of times each device appears within each rank over the timeframe are tallied. The device/rank summations are collectively used as a probability distribution representing the probability of each device being ranked at each of the rankings in the future. Based on this probability distribution, an entropy value that represents a summary of the imbalance of the group of devices over the timeframe is derived. An imbalance alert is generated when one or more entropy values for a group of devices shows an imbalanced utilization of the devices going beyond an identified imbalance threshold.

22 Claims, 9 Drawing Sheets

302
AT A PARTICULAR TIMESTAMP, RECORDING A SET OF DATA POINTS FOR A PARTICULAR DEVICE STATISTIC RELATIVE TO WHICH A PLURALITY OF DEVICES ARE CONFIGURED TO BE BALANCED, WHEREIN THE SET OF DATA POINTS INCLUDES A RESPECTIVE DATA POINT FOR EACH RESPECTIVE DEVICE OF THE PLURALITY OF DEVICES, AND WHEREIN THE PARTICULAR TIMESTAMP IS WITHIN A GIVEN TIMEFRAME

304
SORTING THE SET OF DATA POINTS BY RANK, WHEREIN A RANK OF A GIVEN DATA POINT IS BASED ON A VALUE OF THE GIVEN DATA POINT RELATIVE TO VALUES OF THE OTHER DATA POINTS IN THE SET OF DATA POINTS

306
DETERMINING A RELATIVE NUMBER OF TIMES ONE OR MORE DATA POINTS FOR EACH DEVICE, OF THE PLURALITY OF DEVICES, IS FOUND AT A GIVEN RANK AT EACH TIMESTAMP WITHIN THE GIVEN TIMEFRAME

308
BASED ON THE RELATIVE NUMBER OF TIMES THE ONE OR MORE DATA POINTS FOR EACH DEVICE, OF THE PLURALITY OF DEVICES, IS FOUND AT A GIVEN RANK AT EACH TIMESTAMP WITHIN THE GIVEN TIMEFRAME, DETERMINING AN ENTROPY VALUE THAT REFLECTS AN AMOUNT OF IMBALANCE BETWEEN THE PLURALITY OF DEVICES

DETECTING DEVICE UTILIZATION IMBALANCES

FIELD OF THE INVENTION

The present invention relates to computer system resource management and, more specifically, to maintaining balanced utilization of computing devices with similar capabilities within the same computing system.

BACKGROUND

There are many situations in computer administration where it is beneficial to ensure that a number of similar devices, in a given system, having similar capabilities are utilized roughly evenly. When there is a systematic imbalance in device utilization among a group of devices, it is possible that some of the devices consistently work at or near capacity while others are under-utilized. In this case, the computing system does not realize its full capacity, and some of the money spent on the under-utilized devices has been wasted because their full capacity is not being realized.

For example, a particular computing system includes a cluster of computing devices (nodes) that jointly implement a multi-node database management system (DBMS). The multiple nodes jointly implement the DBMS in order to increase the processing capacity of the system when compared to a single node DBMS. Herein, devices that have similarity of capabilities and purpose that are configured to be utilized evenly (i.e., without excessive imbalance), such as the multiple nodes implementing the multi-node DBMS, are referred to herein as a group of devices.

With regard to the multi-node DBMS, it is more expensive to provision and maintain multiple nodes (rather than a single node), but the expense may be deemed acceptable given the increased capacity for timely responses from the system. In this situation, it is beneficial to ensure that the group of nodes implementing the DBMS are being utilized evenly to perform tasks required by the DBMS. If one or more of the nodes consistently performs more processing for the DBMS than other nodes of the cluster, the under-utilized nodes do not fully contribute to the performance of the system. Such under-utilization may cause the DBMS to have an overall processing capacity that is less than the total processing capacity of the group of nodes.

Another example computing system is a data center that includes a rack server hosting multiple computing devices. The rack server is connected to a local area network (LAN) by a switch that has several parallel links to the LAN. Using multiple parallel links increases the throughput capacity of network traffic to and from the rack server, and also provides resilience in the system such that failure of less than all parallel links will not result in cutting off the rack server from the wider network. If traffic is preferentially sent down one of the group of parallel links, the overall throughput capacity to and from the rack server will be less than the total potential capacity of the parallel links.

A variety of measures may be employed to achieve balanced utilization of a group of devices with similar capabilities performing similar tasks or jointly performing the same task. To illustrate in the context of the rack server example above, routing tables at the switch can be configured to cause traffic to be sent from the rack server to different final destinations in a way that utilizes the multiple parallel links from the switch. Another way of distributing traffic, used in Equal Cost Multi-Path (ECMP) routing, is to hash parts of each packet header coming from the rack server and then to use this hash to deterministically but pseudo-randomly send packets down different links such that packets from the same "flow" go down the same link. In this way, packets in the same flow do not accidentally overtake each other. According to ECMP, all of the parallel links should appear to the system to have equal cost, and, as such, should be utilized pseudorandomly, which should result in roughly equal utilization.

However, measures to utilize multiple devices evenly do not always ensure that the devices are, in fact, evenly utilized. For example, a bug may be introduced into the technique, or measures taken to balance the utilization of a group of devices can be misconfigured. Furthermore, a given technique may have pathological issues given the configuration of the group of devices that should be evenly utilized. In the case of ECMP routing, if a given link goes down, the packet flows assigned to that link are reallocated to another link in the group. When the downed link comes back online, the traffic flows distributed among the group of links may not be evenly disbursed for some time after the failure.

It can be difficult to pinpoint the cause of a sluggish computing system resulting, at least in part, from imbalanced utilization of groups of devices in the system. Many times, a system engineer first detects unexpected sub-par performance of a computing system without any clear indication of the cause of the sub-par performance. The potential causes of sub-par system performance are varied and numerous, with imbalanced utilization of one or more groups of system devices being only one potential cause of computing system underperformance. It can take many different system checks and trial and error tests to identify the cause of sub-par system performance, which require time and money to perform. Furthermore, while the system engineer searches for the source of the problem, the computing system continues with sub-par performance.

Once a system engineer suspects that device utilization imbalance is a potential cause of sub-par performance by the computing system, the engineer may test the hypothesis by inspecting statistics from groups of devices in the sluggish system to identify imbalances. However, a computing system may include hundreds or thousands of groups of devices. Even if it is known that resource utilization imbalance is contributing to a system slow-down, it is a laborious and expensive task to inspect statistics from the computing system to identify which group of devices, out of thousands of groups of devices in the system, are not being evenly utilized. Again, while the engineers manually inspect all of the resources in the system to determine where one or more imbalance issues occur, the system continues to function below capacity.

It would be desirable to automatically detect groups of devices, in a system, that are not being utilized evenly in order to expedite restoration of proper performance of the system.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

In the drawings:

FIG. 3 depicts a flowchart for automatically identifying a group of devices in a computing system that are not being utilized evenly.

DETAILED DESCRIPTION

Figure 1:
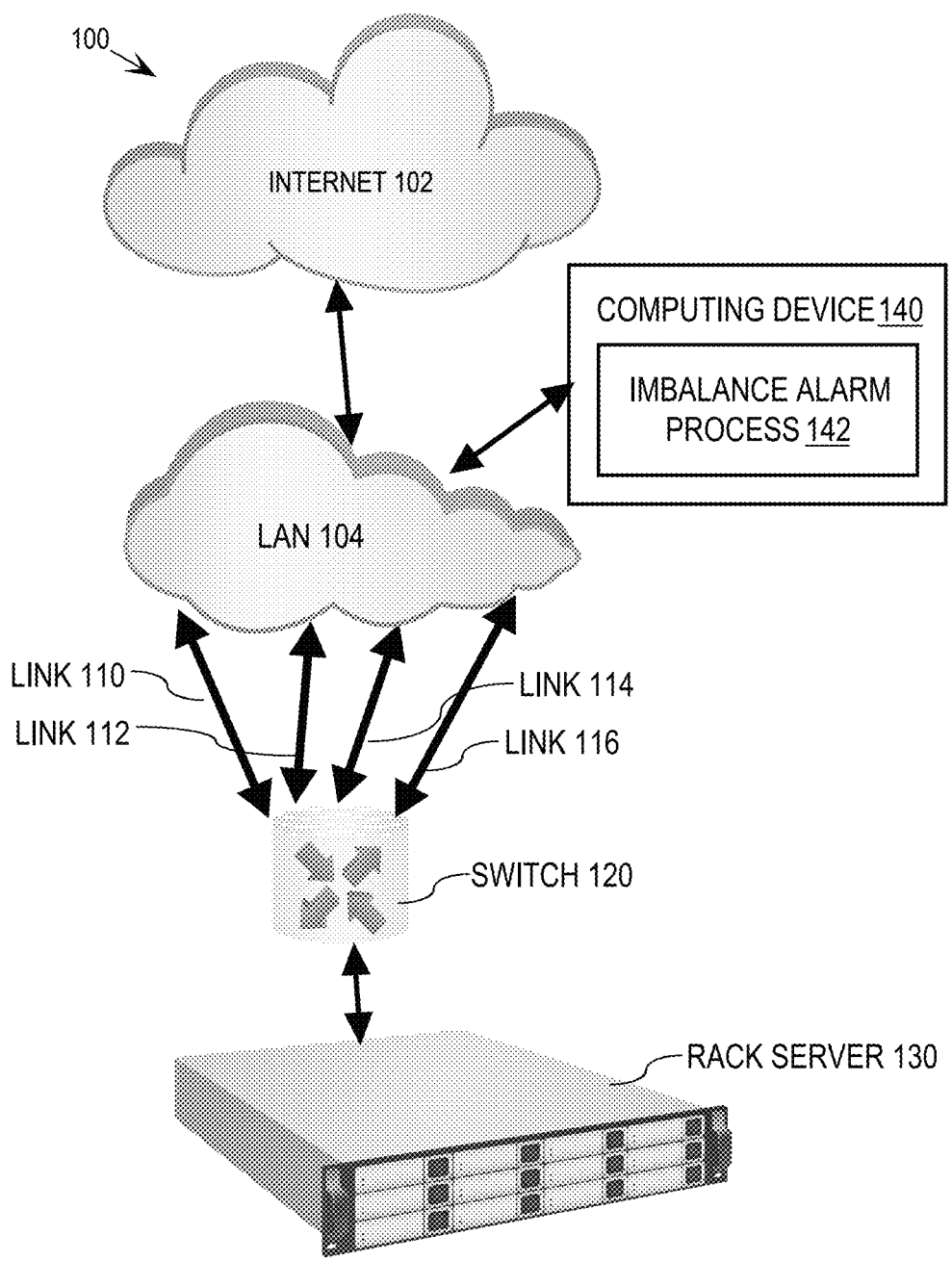
FIG. 1 depicts an example computing system on which embodiments may be implemented.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Embodiments are directed to monitoring statistics from groups of devices, within a computing system, and automatically generating an alarm upon detecting an imbalance that is beyond a configured threshold. Specifically, embodiments sample, at particular timestamps within a set timeframe, statistics for a group of devices with respect to which the devices are configured to be balanced. For example, a group of network links having similar capabilities that transmit data from the same server rack should all have similar throughput statistics over time.

Embodiments rank the group of devices based on the gathered device statistics for every respective timestamp within the set timeframe. Trends in device utilization are derived based on analysis of the resulting series of rankings of the devices. Specifically, the numbers of times each device appears within each rank in the history of rankings over the set timeframe are tallied and the device/rank summations are collectively used as a probability distribution representing the probability of each device in the group being ranked at each of the rankings at future times.

Based on the resulting probability distribution, embodiments derive an entropy value for the group of devices for the timeframe over which the statistics were recorded. The entropy value represents a summary of the amount of imbalanced utilization of the group of devices over the timeframe. The fundamental intuition behind this algorithm is that when utilization of a group of devices is balanced, in every rank there will be an equal number of rankings of each device in the group. According to an embodiment, the derived entropy value represents the degree of divergence from this symmetrical ideal.

Deriving an entropy value from data gathered over a sufficient length of time allows measurement of trends in device balance while minimizing the affect from transient imbalances in device utilization. Transient imbalances among a group of devices are very common given that not all tasks assigned to devices of a group of devices are equal, and it is not always possible to divide work among the devices perfectly evenly. Such transient imbalances should not generate an alert because their presence does not necessarily indicate an overall imbalance in utilization of the group of devices.

Thus, embodiments generate an imbalance alert when it is determined that one or more entropy values derived for a given group of devices shows a non-transient imbalanced utilization of the devices, which goes beyond an identified threshold. An identified threshold may be a simple threshold, a standard deviation threshold, or a probability threshold. Proper configuration of the threshold, as well as proper configuration of the timeframe over which the statistics for a given entropy value are gathered, prevent generation of an imbalance alert based on transient utilization imbalances that are inherent to the group of devices.

When two or more devices in a group have very small differences in data point values, the values may be blurred in order to reduce the probability of an alert caused by one device of the group consistently being utilized more than another device, but by a very small amount. If the devices are at almost equal utilization, the small differences may cause an unnecessary alert for an administrator that does not consider such small differences to be evidence of an imbalance. Thus, according to an embodiment, data points that are very similar (or the same) in value are blurred and/or differentiated by introducing pseudorandom elements to the ranking of the devices based on these statistics.

Embodiments analyze rankings of statistics gathered for a group of devices over time, rather than analyzing the gathered statistical values themselves. Hence embodiments are independent of scale and can be used without further parameterization on any data.

Also, the derived entropy value is a single number that concisely represents the level of imbalance in the utilization of a group of devices. Because the magnitude of imbalance is represented by a single number, the imbalance status of groups of devices may be quickly understood and easily displayed to administrators of the system in a variety of ways, including simple illustrations of system imbalance "health" based on the entropy values of the groups of devices within a computing system being administered.

Thus, embodiments enact a configurable automatic alarm system for computing device imbalance, which improves computer functionality by allowing almost immediate detection of imbalance issues. Immediate detection of imbalance issues within a computing system allows redress of the issues in a timely manner, which prevents prolonged sub-par performance of the computing system during the otherwise necessary debugging process.

Embodiments require little computational resources given the very small footprint of historical data points being stored for imbalance detection and the relatively simple computations required. Furthermore, embodiments require very little administrator configuration time or attention in order to monitor hundreds or thousands of groups of devices within a computing system. In a system with thousands of groups of devices, a system engineer may spend all of her time reviewing statistics of groups of devices to search for imbalances, which results in a very expensive search with limited results, especially if only a small subset of the groups of devices are imbalanced. Such a visual search is even more cost-ineffective when considering that imbalances in a group of devices do not generally break a system down, but only reduce the capacity of the system.

While preserving system capacity is important to prevent sub-optimal functioning of system resources, in the absence of automatic indications of system imbalances as supplied by embodiments described herein, engineer attention is generally better spent addressing problems that impede the functioning of the system at large. Thus, according to embodiments, administrators automatically receive alerts regarding system imbalances that may affect system health, which, without an automatic alert system, may take administrators an impractically long time to identify as the cause of a system slowdown.

Balanced Resources

Many systems include groups of devices with similar capabilities that are configured to be utilized similarly. For example, a given group of devices accomplish the same task jointly and in parallel, and have similar capabilities. Groups of devices are generally meant to be used evenly so as to take advantage of the full capacity of the devices in performing the joint task.

Embodiments described herein are directed to detecting imbalanced utilization of any kind of group of devices in a computing system and based on any kind of statistic with respect to which balanced utilization is desirable. The following are metrics that may be desirable to balance among a group of devices in a system: processor load, storage consumption, maximum response time, temperature, power, fan speed, etc. Such metrics are evidence of how resources (such as data throughput, processing capacity, storage capacity, response time, hardware health, electricity utilization, etc.) are allocated within a computing system.

FIG. 1 depicts an example computing system 100 (such as a portion of a data center) that includes a group of network links that are configured to be balanced with respect to the metric of data throughput. Specifically, computing system 100 includes a rack server 130 that hosts multiple computing devices. The computing devices hosted in rack server 130 are communicatively connected to a "top-of-rack" switch 120, which communicatively joins the computing devices to a local area network (LAN) 104. According to the example of system 100, switch 120 spreads the network traffic from the computing devices in rack server 130 across a group of four parallel links 110-116. Such a group of links may be configured to function in parallel for purposes of system reliability and resilience, increased throughput, and load balancing.

In general, the utilization of a group of devices, even when "evenly" balanced, involve temporary imbalances that even out over a sufficient amount of time. Specifically, there is generally some bottleneck in any group of devices, where one device of the group is being utilized more than the other devices of the group. When the bottleneck of a group of devices moves unpredictably from one to another of the devices such that the devices of the group all behave similarly over time, utilization of the group is considered to be "balanced" within an acceptable threshold of imbalance. On the contrary, device utilization in an imbalanced group of devices does not even out over time but, instead, shows a decided trend over time to over-utilization of one or more particular devices in the group and under-utilization of the other devices.

Figure 5A:
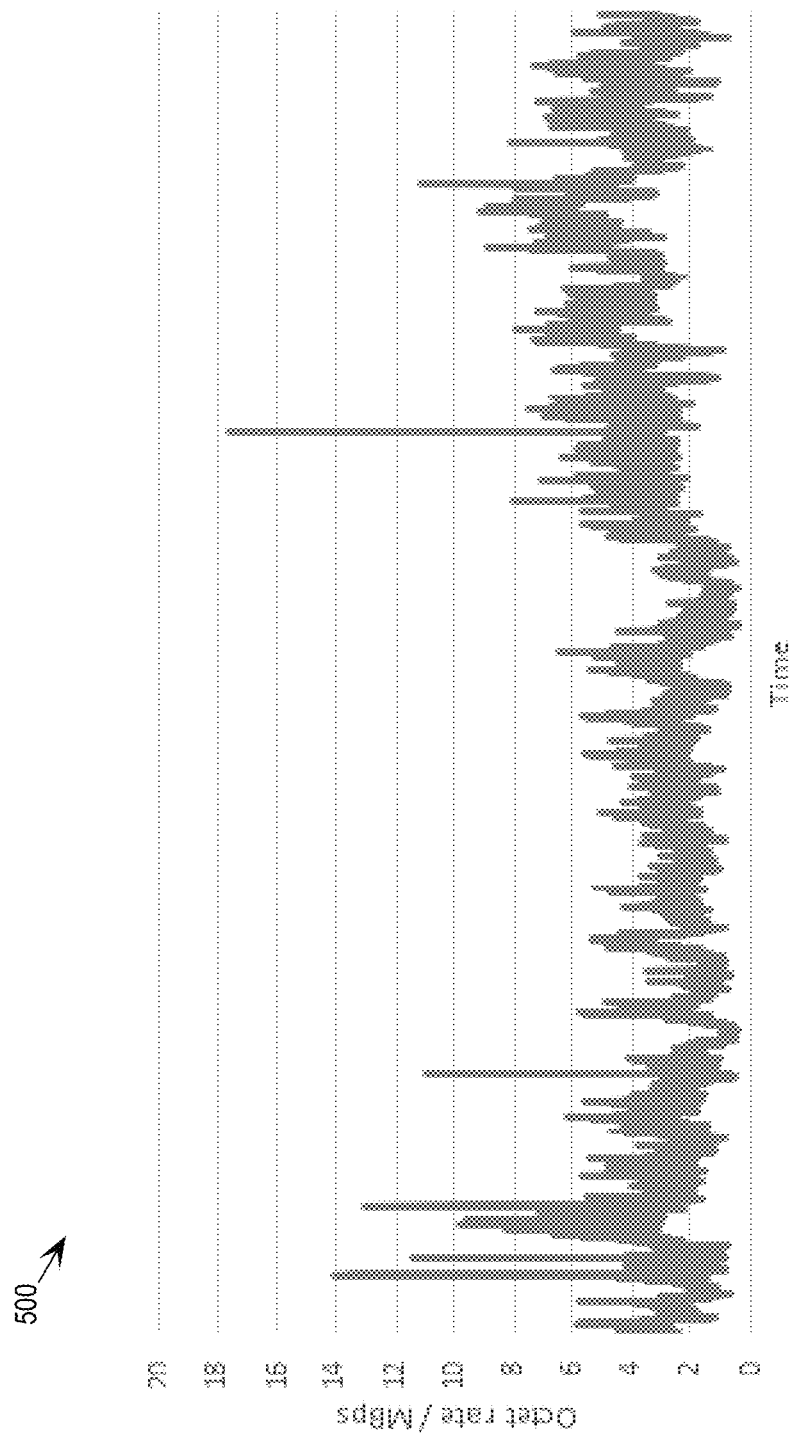
FIGS. 5A-B depict graphs of network traffic over one or more network links.

Returning to the context of example computing system 100, links 110-116 carry network traffic, which is unpredictable in nature as depicted in graph 500 of FIG. 5. Graph 500 represents a network traffic trace that simulates typical network traffic over a link. Such traces tend to depart from their mean values in non-Gaussian ways: (1) they have huge short-lived spikes, and (2) they tend to wander away from their mean for long periods. Hence, when several such series are plotted together for visual inspection with a relatively short timeframe, it can be difficult to confidently determine whether an apparent imbalance reflects a true underlying asymmetry. Detection of a true imbalance only becomes clear based on data collected over a sufficiently long timeframe.

Figure 2:
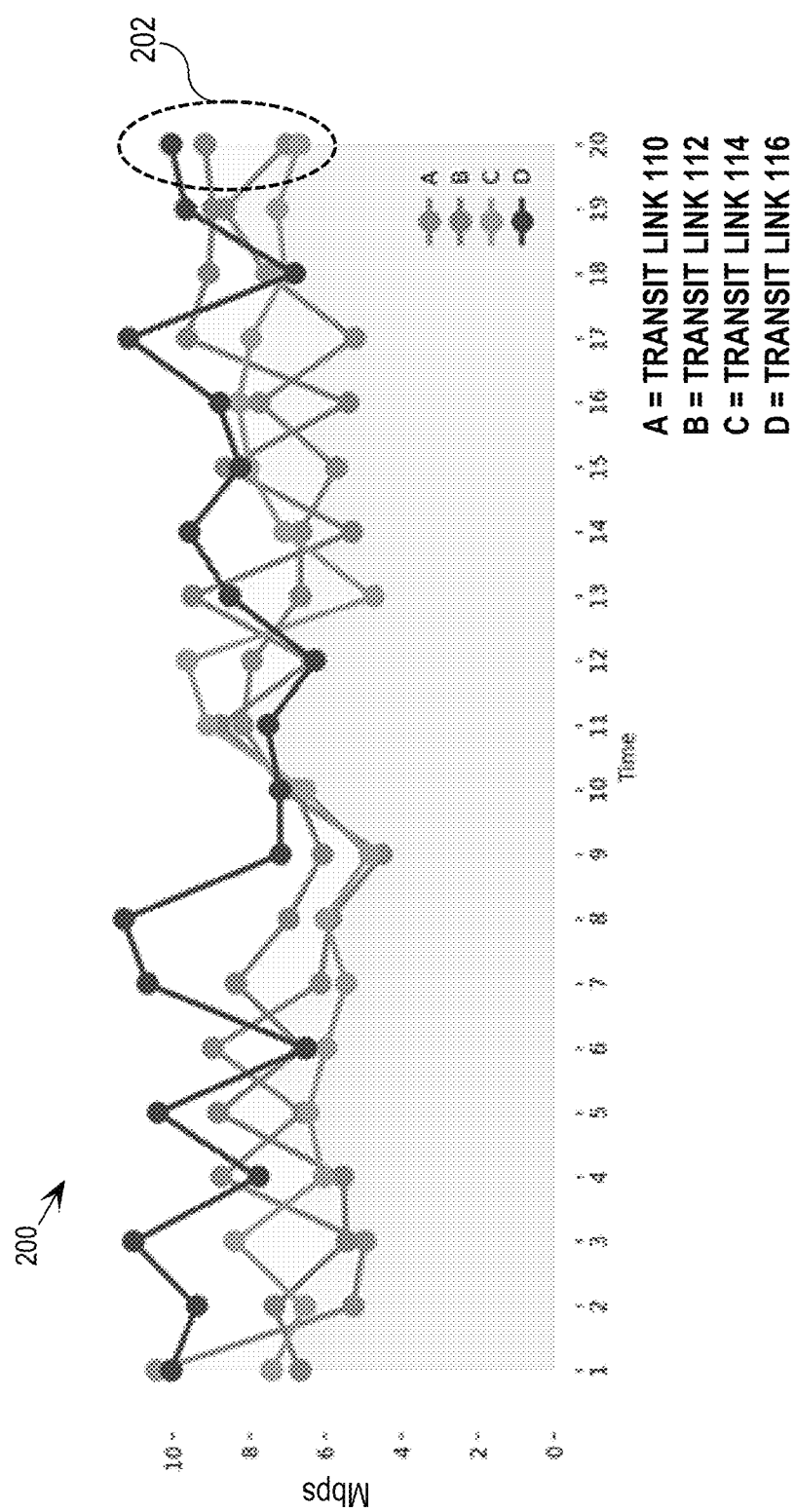
FIG. 2 depicts a graph of a collection of time-series, with common timestamps, showing the utilization of a group of devices over a given timeframe.

FIG. 2 depicts a graph 200 of a collection of time-series, with common timestamps, showing an example utilization of links 110-116 over a timeframe that is sufficiently long to indicate whether the group of links is subject to an overall imbalance. Each series is identified by a different name (i.e., A, B, C, and D) that maps to a respective one of links 110-116. At each timestamp indicated in graph 200, the graph shows a data point for each link of the group, which indicates how much data was being transmitted through the respective link at the respective timestamp. According to an embodiment, data points gathered for a group of devices are considered to be taken at the same timestamp if the data points were gathered within a threshold amount of time of each other, e.g., where the first recorded data point and the last recorded data point for a group of devices are gathered within one second of each other, or where the data points were gathered within one second of the timestamp.

Upon visual inspection of graph 200, it is clear that link 116 carries more data, during the indicated timeframe, than the other links of the group of links. One situation that can cause imbalance is when a given source of network traffic of a given type is dominant compared to data from other sources or compared to network traffic of other types. Also, when a link of a group of links fails, traffic that was previously directed over the failed link is caused to be reassigned to another link in the group. When the failed link comes back on line, the traffic that was previously assigned to the link may not come back to the now restored link.

Automatically Identifying Systematic Resource Imbalance

While it may be intuitive to determine, based upon visual inspection of statistics gathered for a group of devices over a sufficiently long timeframe, whether the group of devices is being utilized evenly, it is less intuitive to detect an imbalance in a group of devices automatically. Further, as indicated above, it is impractical for a system engineer to monitor the statistics of system resources to identify imbalances in groups of devices, which cause the system to perform below capacity, but which may not completely impede system functioning.

Thus, embodiments generate alerts when groups of devices are automatically detected to be subject to utilization imbalance based on data gathered for the devices over a sufficiently long timeframe and based upon a configurable imbalance threshold. Based on such alerts, system engineers may focus their attention only on groups of devices whose statistics show evidence of imbalanced utilization. In this way, embodiments improve the functioning of the computing system by generating automatic alerts for system imbalances. Further, automatic generation of alerts allows engineers to take the time to rebalance the utilization of groups of devices for which alerts have been generated without wasting time and money on searching for potential imbalances in statistics of the system.

FIG. 3 depicts a flowchart 300 for automatically identifying a group of devices in a computing system that are not being utilized evenly. Specifically, at step 302, at a particular timestamp, a set of data points for a particular device statistic relative to which a plurality of devices are configured to be balanced are recorded, where the set of data points includes a respective data point for each respective device of the plurality of devices, and where the particular timestamp is within a given timeframe. For example, system 100 periodically records data points, of a particular statistic, for a particular group of resources that are configured to be balanced with respect to the particular statistic.

As a more specific example, links 110-116 are considered herein to be a "group" of devices because the links have similar capabilities and they function in parallel to accomplish a given task, i.e., transmitting network information to and from the computing devices in rack server 130. System 100 collects information about the data throughput of each of links 110-116 as evidence of whether the group of links are utilized evenly by system 100.

According to an embodiment, system 100 collects data throughput statistics for links 110-116 based on links 110-116 being registered with system 100 as a group of devices that should be balanced with respect to data throughput. The registration for a given group of devices contains parameter values that include one or more of: identifiers of devices in the group of devices, an identifier of the group, a type of statistic to be gathered for the group of devices, a timeframe for stored data, an amount of time between data collection timestamps within the timeframe, a number of data point samples to be taken during the indicated timeframe, etc. System 100 periodically records statistics, for every registered group of devices, based on the parameters in the registration of the group of devices.

According to embodiments, the timeframe over which data is gathered for automatic analysis is configurable. An appropriate timeframe depends on the utilization patterns of the group of devices being tested for imbalance. Basing imbalance detection on data gathered over a timeframe that is too small to show the overall traffic patterns can generate imbalance alerts based on transient imbalances rather than on overall trends in device usage.

Continuing with the above example, system 100 periodically collects throughput statistics for each of links 110-116, and stores the statistics for the timeframe configured for the group of devices. FIG. 2 depicts four time-series, labelled "A", "B", "C", and "D", each of which represents example throughput statistics for links 110-116 that system 100 gathers every three minutes over the timeframe of an hour. The set of statistics 202 at timestamp "20" are the latest set of statistics for links 110-116 gathered by the system. In the latest set of throughput statistics 202 for links 110-116, the throughput for link 110 is 7 Mbps, the throughput for link 112 is 9 Mbps, the throughput for link 114 is 6.5 Mbps, and the throughput for link 116 is 10 Mbps. The data points for each device of the group of devices attributed to a given timestamp were collected within a threshold amount of time from each other or from the timestamp (e.g., within one second of the indicated timestamp). Any stored data that falls outside of the timeframe for the group of devices is discarded.

At step 304, the set of data points are sorted by rank, where a rank of a given data point is based on a value of the given data point relative to values of the other data points in the set of data points. For example, a computing device 140 of system 100 implements an imbalance alarm process (IAP) 142 that has access to statistics gathered for groups of devices being monitored for imbalance by system 100.

Continuing with the example group of devices from FIG. 1, IAP 142 ranks, for each timestamp, the data points recorded for links 110-116 based on the respective magnitudes of the individual recorded statistics. To illustrate for timestamp "20" in graph 200, the latest set of throughput statistics 202 are ranked as shown in ranked statistics 402 of graph 400 in FIG. 4A. Graph 400 shows all of the statistics gathered for links 110-116 over the past hour from graph 200 ranked by magnitude. Specifically, as shown in ranked statistics 402, because link 116 had a throughput of 10 Mbps, which is the highest throughput data point among the group of devices at timestamp "20", link 116 is assigned the timestamp-specific rank of "1". Further, link 112 is assigned the rank of "2", having the second highest throughput, link 110 is assigned the rank of "3", and link 114 is assigned the rank of "4" for timestamp "20".

Figure 4A:
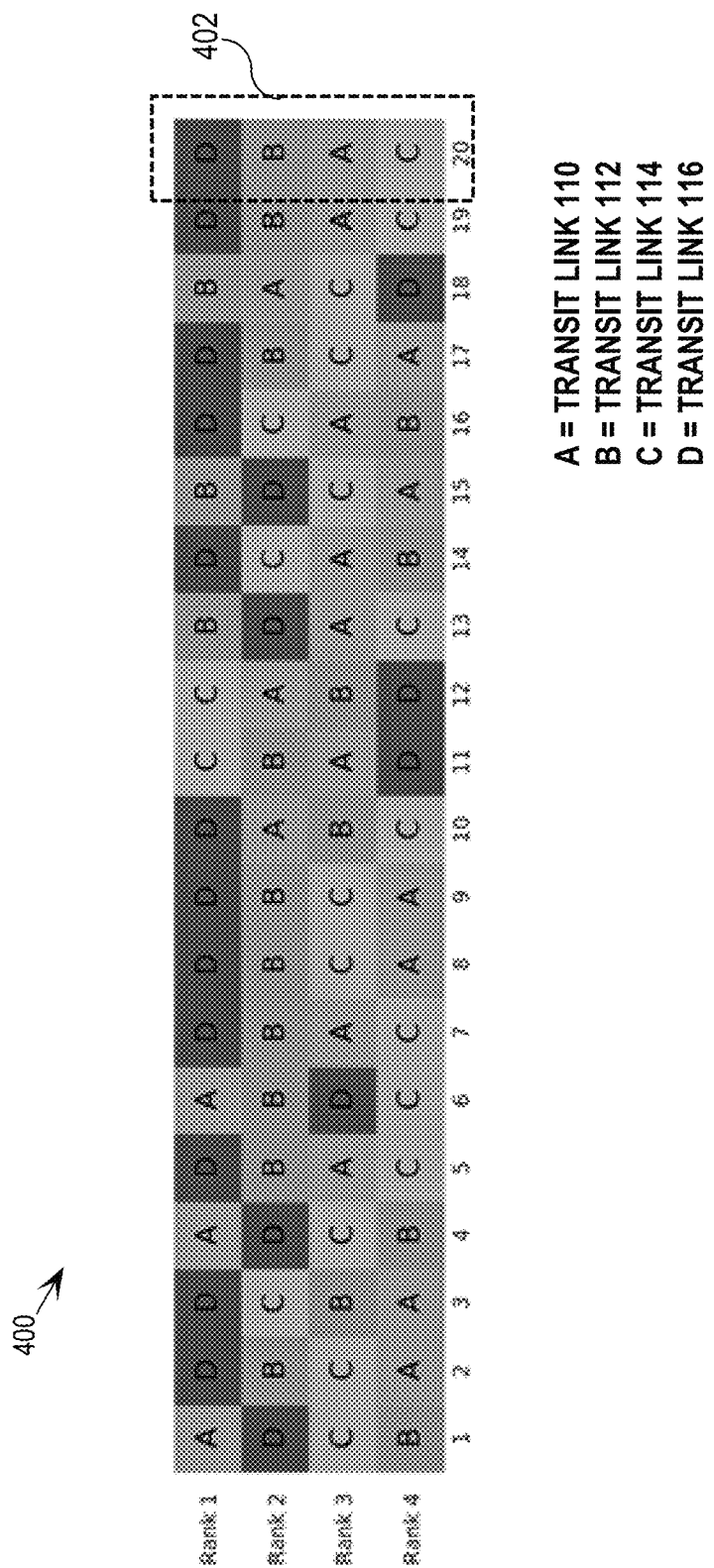
FIGS. 4A-B depict graphs in which all of the sets of statistics gathered for a group of devices during a given timeframe are ranked by magnitude according to the values at each respective timestamp.

Once the data points collected for a given timestamp are ranked, the values of the statistics are discarded. Embodiments use the rankings to identify utilization imbalance without regard to magnitudes of differences between the ranked data points. As such, IAP 142 stores the rankings of the group of devices for all timestamps within the configured timeframe, as depicted in FIG. 4A. According to an embodiment, IAP 142 stores the ranking information without storing the magnitudes of the data points on which the rankings are based.

In this way, the ranking step strips the magnitudes of the collected statistics from the record of the statistics while preserving information indicating the relative dominance of the devices at each timestamp. Storing ranking information without storing the magnitudes of the data points reduces the footprint of data required to be stored for each group of devices. For example, each of the ranked statistics in graph 400, including ranked statistics 402, are stored in a single byte given mappings of each of links 110-116 to identifier numbers, such as 0, 1, 2, and 3.

To illustrate, the links in group of links 110-116 are assigned to identifier numbers as follows: link 110 is assigned the identifier 0, link 112 is assigned the identifier 1, link 114 is assigned the identifier 2, and link 116 is assigned the identifier 3. To represent the rankings in ranked statistics 402, IAP 142 stores the following byte for timestamp "20": 11010010, where each set of two bits in the byte is the identifier of one of links 110-116 ordered by rank at timestamp "20". Referring to the example byte representation of the rankings in ranked statistics 402, the first two bits "11" (binary representation of "3") represent link 116 at rank #1, the second two bits "01" (binary representation of "1") represent link 112 at rank #2, the third two bits "00" (binary representation of "0") represent link 110 at rank #3, and the fourth two bits "10" (binary representation of "2") represent link 114 at rank #4.

The amount of storage for simple data types (such as the example byte of information described above) that are required to store rankings of data points over a given timeframe is smaller than the amount of storage needed to store the data point magnitudes themselves. For example, data point magnitudes that are measured to several digits after the decimal point require memory-intensive data structures, such as floating point data structures (each of which require 32-64 bits). Even data point magnitudes that are measured to the nearest integer require more storage space (at least 16 bits per number) than ranking data.

Also, because imbalance detection is based on rankings of data points rather than the magnitudes of the data points as described herein, processing power required for imbalance detection is reduced because the size of the data on which the imbalance detection is based is relatively small. Furthermore, as described in detail below, basing the utilization imbalance detection on rankings rather than magnitudes of data points allows for the rankings to be used as a probability distribution that estimates how the data points will be ranked in the future.

Figure 4B:
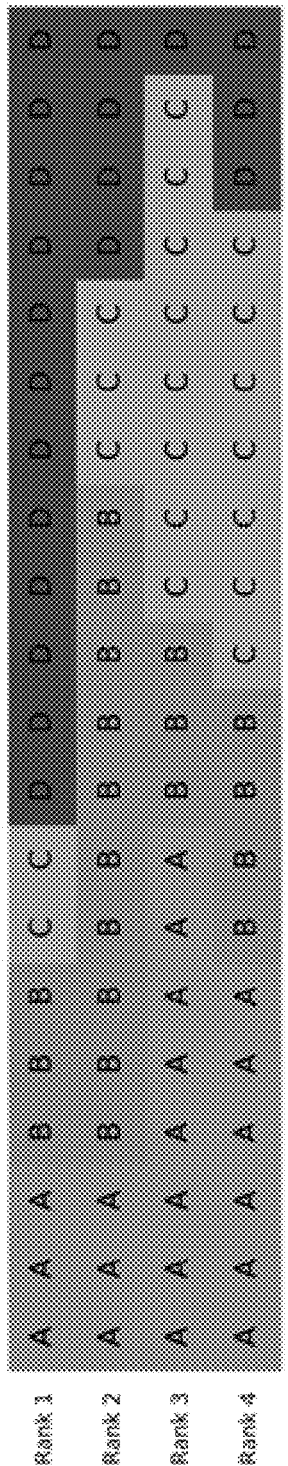

At step 306 of flowchart 300, a relative number of times one or more data points for each device, of the plurality of devices, is found at a given rank at each timestamp within the given timeframe is determined. For example, IAP 142 accesses the record of device rankings for links 110-116 and determines the number of times, within the last hour, that each of links 110-116 is found at each of the respective rankings. To illustrate, FIG. 4B depicts a graph 410 showing how many times each link has been ranked at each of the rankings over the past hour. Thus, graph 410 demonstrates the proportion of each link ranked at every rank. For example, at rank 1, there are three "A"s (link 110), three "B"s (link 112), two "C"s (link 114), and twelve "D"s (link 116). The tallied instances of each link at each rank may be used as a probability distribution as described in further detail below.

An example of processing required to determine number of times one or more data points for each device, of the plurality of devices, is found at a given rank at each timestamp within the given timeframe is now described according to an embodiment that represents rankings for links 110-116 at each timestamp with a byte of data as described in detail above. Specifically, IAP 142 initializes each counter in a four by four array of counters to zero, where each counter in the array represents the number of times a corresponding device was recorded at a corresponding rank. IAP 142 parses the respective byte stored for each timestamp during the indicated timeframe and increments the counters in the array that correspond to the stored ranking data.

Taking ranked statistics 402 as an example, IAP 142 parses the byte of ranking data stored for timestamp "20" and determines that the first two bits "11" represent link 116 at rank #1. Accordingly, IAP 142 increments the counter at [0][3] in the array, which counter corresponds to rank #1 and to link 116. IAP 142 determines that the second two bits "01" represent link 112 at rank #2 and accordingly increments the corresponding counter at [1][1] in the array. IAP 142 determines that the third two bits "00" represent link 110 at rank #3 and accordingly increments the corresponding counter at [2][0] in the array. IAP 142 also determines that the fourth two bits "10" represent link 114 at rank #4 and accordingly increments the corresponding counter at [3][2] in the array.

As shown above, implementing step 306 based on the very small representations of rankings stored by IAP 142 for each timestamp requires much less processing power than would be required for parsing, sorting, and tallying relatively large representations of data point magnitudes for each timestamp.

It is noted that graph 410 depicts sorted data within each rank in order to more clearly illustrate the proportions of relative link rankings at the respective ranks. However, any method of counting the numbers of times the links are ranked at each ranking may be used, according to implementation.

At step 308, an entropy value that reflects an amount of imbalance between the plurality of devices is determined based on the relative number of times the one or more data points for each device, of the plurality of devices, is found at a given rank at each timestamp within the given timeframe. The fundamental intuition behind determination is that when the utilization of the group of devices is balanced, in every rank there will be an equal number of instances of a data point from every device in the group. Imbalance is the degree of divergence from this symmetrical ideal.

In order to quantify the degree of divergence among utilization of links 110-116 during the past hour, each rank is considered separately, where the entries in a given rank are collectively regarded as a probability distribution for the group of links 110-116 at the rank. Embodiments calculate the entropy of that distribution and add it to a running total, which, when complete, is referred to herein as a total entropy value. If the links appear an equal number of times at each rank, the total entropy value will be high. If some of the devices appear more than others within any given rank, the total entropy value will be lower. In the case that data points for only one link appear at a particular rank, its contribution to the total entropy value will be zero.

According to one or more embodiments, a maximum value that the total entropy would have if all of the devices appeared exactly equally at every rank is calculated. IAP 142 calculates an entropy deficit value by subtracting the total entropy value from the maximum value. In such an embodiment, the entropy value is the entropy deficit, which is the amount that the total entropy value determined based on the probability distribution for the group of devices falls short of the highest possible entropy for the group. Thus, a value of zero for the entropy deficit value indicates perfect balance, and a higher value of an entropy deficit indicates more imbalance for the group of devices.

Continuing with the above example, IAP 142 calculates an entropy deficit value that represents the imbalance between utilization of links 110-116. IAP 142 determines entropies for the probability distribution indicated by graph 410 as follows (where entropy$(p)=p \times \log_2(1/p)$):

rank 1
A: 3; p=3/20=0.150000; entropy=0.410545
B: 3; p=3/20=0.150000; entropy=0.410545
C: 2; p=2/20=0.100000; entropy=0.332193
D: 12; p=12/20=0.600000; entropy=0.442179
rank 2
A: 3; p=3/20=0.150000; entropy=0.410545
B: 10; p=10/20=0.500000; entropy=0.500000
C: 3; p=3/20=0.150000; entropy=0.410545
D: 4; p=4/20=0.200000; entropy=0.464386
rank 3
A: 8; p=8/20=0.400000; entropy=0.528771
B: 3; p=3/20=0.150000; entropy=0.410545
C: 8; p=8/20=0.400000; entropy=0.528771
D: 1; p=1/20=0.050000; entropy=0.216096
rank 4
A: 6; p=6/20=0.300000; entropy=0.521090
B: 4; p=4/20=0.200000; entropy=0.464386
C: 7; p=7/20=0.350000; entropy=0.530101
D: 3; p=3/20=0.150000; entropy=0.410545
total entropy=6.99124160809

Taking the rankings as a probability distribution that can be used to predict the future utilization of links 110-116, the probability of the utilization of each device being ranked at a given rank is the number of times the device was ranked at that rank divided by the total number of samples taken. According to the embodiment that tallies the number of times that each device was ranked at a given rank within a two-dimensional array as described above, IAP 142 pulls the number of times a given device was ranked at a given rank from the corresponding counter in the array, which is an inexpensive action. For example, the counter at [0][0] in the two-dimensional array that includes counters representing the counts as depicted in graph 410 of FIG. 4B stores the tally of the number of times that link 110 (labelled "A" in graph 410) was ranked at rank #1 during the indicated timeframe, i.e., 3 times. Based on the count of 3 recorded by the counter at [0][0] in the two dimensional array, the probability (p) of the utilization metric of link 110 ("A") being ranked #1 is 3/20. Thus, the entropy contribution of link 110 at rank #1 is as follows:

Entropy of link 110 at rank #1=$3/20 \times \log_2(1/(3/20))$
=0.410545.

The total entropy is the sum of all entropies for every device in the group at every rank. Thus, the total entropy of the group of devices is calculated by considering the rankings as a probability distribution. The higher the total entropy of the probability distribution, the more balanced the utilization of the group of devices has been shown to be.

According to an embodiment, IAP 142 calculates an entropy deficit value based on the total entropy, which indicates a higher imbalance when the entropy deficit is higher. In order to determine the entropy deficit, IAP 142 calculates the maximum entropy value that is possible for the probability distribution. Specifically, because there are four devices in the group of devices being considered, the maximum entropy is $4 \times \log_2(4)=8$. Thus, the maximum entropy for links 110-116 is 8.0. IAP subtracts the total entropy for links 110-116 from the maximum entropy and finds a traffic rank entropy deficit of 1.00875839191.

According to an embodiment, IAP 142 calculates an entropy percentage value based on the total entropy value, i.e., [total entropy]/[max entropy], which indicates how close to perfectly balanced is the group of devices. For example, the entropy percentage value of the above example probability distribution is 6.99124160809/8.0=87.39%. Thus, the example data is 87.39% balanced.

According to another embodiment, IAP 142 calculates an entropy deficit percentage value based on the entropy deficit value, i.e., [entropy deficit]/[max entropy], which indicates how close to totally imbalanced is the group of devices. For example, the entropy deficit percentage value of the above example probability distribution is 1.00875839191/8.0=12.61%.

Using a percentage normalizes the scale of the entropy values based on the maximum entropy value. Embodiments are described below as using the entropy deficit percentage value as the gauge used to determine whether a group of devices are balanced. However, any of the described entropy values (i.e., total entropy, entropy deficit, entropy percentage value, and entropy deficit percentage value) may be used to automatically identify device utilization imbalance, according to embodiments.

According to another embodiment, IAP 142 calculates a normalized entropy value or a normalized entropy deficit value for a given group of devices. A normalized entropy value results from dividing the total entropy value by the number of devices in the group of devices, and a normalized entropy deficit value results from dividing the entropy deficit value by the number of devices in the group of devices. As with the percentage values, normalized entropy values for a given group of devices are on a similar scale as entropy values calculated for other groups of devices.

Both the total entropy and the entropy deficit values (and also the percentages based on these values) indicate that links 110-116 are being utilized in an imbalanced way, where the utilization is not highly imbalanced.

Raising an Alarm

Having produced an entropy value that reflects the balance of a given group of devices, the question remains of whether to actually raise an alarm regarding the group of devices. Because at least some imbalance is generally expected in the utilization of a group of devices, raising an alarm for any entropy value that shows less than perfect balance would result in virtually constant alarms and would not convey useful information and certainly would not contribute to improving the functionality of a computing system. As such, IAP 142 generates an alarm based on detecting one of the following alarm conditions. According to an embodiment, IAP 142 is configured with multiple of these alarm conditions, and the alarm condition that is applicable to a given group of devices is either configurable by an administrator, or is automatically selected by IAP 142.

Simple Threshold Alarm Condition

According to a simple threshold alarm condition, IAP 142 generates an alarm for a given group of devices when an entropy value determined for the group either exceeds or falls short of a threshold, depending on the type of entropy value. For example, when the entropy value being generated is the total entropy value or the entropy percentage value, an alarm is generated if the entropy value falls short of a threshold value. On the other hand, when the entropy value being generated is the entropy deficit value or the entropy deficit percentage value, an alarm is generated if the entropy value exceeds a threshold value. The threshold value is configurable, which allows an administrator to have more control over when (and how many) alarms are generated.

According to an embodiment, IAP 142 adapts the criteria for generating an alarm based on feedback from an administrator. Specifically, IAP 142 is configured with an adaptation mode that may be engaged by a system administrator. While in adaptation mode for a given group of devices, IAP 142 first monitors the balance of the group based on an initial simple threshold value. The initial threshold value for the alarm condition is either configured by an administrator or is a default value (such as 25% given an entropy value type of entropy deficit percentage). Upon detecting that an entropy value for the group of devices triggers the threshold alarm condition, IAP 142 generates and publishes an alarm for the group of devices. IAP 142 also publishes a request for feedback from the administrators indicating whether the alarm was a true or false alarm.

Upon receiving feedback that the most recent alarm was a false alarm, IAP 142 adjusts the threshold value to be more restrictive by an increment that is either set by a system administrator or is a default increment. For example, given an increment of 5% and having received feedback from administrators that the most recent alarm was a false alarm, IAP 142 adjusts the simple threshold value of 25% to 30%.

After adjusting the threshold value, IAP 142 compares entropy values generated for the group of devices to the adjusted threshold in order to determine whether to generate and publish an alarm for the group. Until receiving feedback from an administrator that a generated alarm was a "true" (or desirable) alarm, IAP 142 continues in adaptation mode and, as such, continues to request feedback for at least a portion of the alarms generated based on a given adjusted simple threshold value and then adjusting the simple threshold based on receiving feedback that an alarm was "false".

Upon receiving feedback from an administrator that an alarm was a "true" (or desirable) alarm, IAP 142 determines that it has reached a final simple alarm threshold that is acceptable to administrators. As such, IAP 142 reverts to a standard mode in which IAP 142 discontinues requesting feedback from administrators regarding the desirability of alarms and compares entropy values for the group of devices to the final simple alarm threshold.

Standard Deviation Threshold Alarm Condition

According to a standard deviation threshold alarm condition, IAP 142 records the entropy values generated for a given group of devices over time and raises an alarm when an entropy value is generated for the group that crosses a standard deviation threshold based on the history of entropy values recorded for the group. For example, IAP 142 measures the mean and standard deviation of historical entropy values for the given group of devices, and generates an alarm for the group when an entropy value is generated that crosses a configurable standard deviation threshold, such as mean+3×standard deviation. Such a condition measures whether something about the utilization of the group of devices has changed in a way that imbalances the utilization of the devices.

According to an embodiment, groups of devices are associated with a type value where groups of devices that are the same type are expected to function similarly with similar statistics that reflect the balance in the groups of devices. For example, the group of devices comprising links 110-116 are of the same type as another group of links that have similar capacities to links 110-116. IAP 142 collectively records historical entropy values for groups of devices that are of the same type and calculates the mean and standard deviation based on the historical entropy values for all groups of devices of the same type. In this way, IAP 142 measures whether a given group of devices functions similarly to comparable other groups of devices, which accelerates the determination of whether there is an imbalance in a given group of devices of that type. Using this kind of diverse historical data may identify issues within a group of devices that systematically are more imbalanced than other groups of the same type. Furthermore, accurate determination of means and standard deviations are accelerated because the historical data accumulates data points more quickly from multiple groups of devices than it would from the individual groups of devices alone.

According to an embodiment, IAP 142 applies a simple threshold alarm condition to entropy values generated for a given group of devices until a sufficient sample size of historical entropy values are recorded for the given group. Once a sufficient sample size of historical entropy values are recorded for the given group, IAP 142 automatically switches to a standard deviation alarm condition, as discussed above.

According to an embodiment, IAP 142 uses both a simple threshold condition and a standard deviation condition. The alarms generated and published for a group includes what kind of condition triggered the alarm. Alarms generated based on the simple threshold condition may be of lower priority than alarms generated based on the standard deviation alarm condition because the standard deviation alarm condition is highly indicative of changes in utilization of a group of devices over time.

Probability Threshold Alarm Condition

According to a probability threshold alarm condition, a two-hypothesis model such as Sequential Probability Ratio Test (SPRT) is trained on the data and also on the desired false-alarm and missed-alarm probabilities. Such an alarm condition would be less sensitive to transient imbalances evidenced in the statistics gathered for a group of devices, while detecting trends in the statistics. Specifically, IAP 142 applies SPRT to a given entropy value derived from the probability distribution comprising the rankings of the group of devices over a prescribed timeframe to determine how probable it was to generate the entropy value from the probability distribution.

According to an embodiment, IAP 142 generates an alarm when it is determined that a single entropy value is under a given probability threshold (such as 30%). According to another embodiment, IAP 142 generates an alarm when a given percentage of a number of the most recent entropy values were under the probability threshold.

As a further illustration, hypothesis H0 represents "all ok", and hypothesis H1 represents "problem". For H0, there is a probability distribution P(H0) from which entropy values for a particular group of devices appear to be drawn, on the assumption that the particular group of devices is in state H0 (or, in other words, assuming that the particular group of devices are being utilized "evenly"). According to an embodiment, a simple choice for P(H0) would be to assume a Gaussian distribution and take the mean and standard deviation of entropy values (for a given group of devices or for a plurality of groups of devices) as described above in connection with the standard deviation threshold alarm condition.

Similarly, for H1, there is a probability distribution P(H1). IAP 142 may not have access to many samples for H1 (because groups of devices are generally utilized in a relatively balanced way, or, in other words, there is generally not a "problem" with the utilization balance among a given group of devices). Thus, according to an embodiment, IAP 142 utilizes an alarm threshold that is a certain distance from the mean of H0, such that H1−mean=H0−mean+alarm-margin, where the alarm-margin is either a default value or a configured value. In the absence of samples that evidence a "problem" with the utilization balance of devices, IAP 142 sets the standard deviation measure for H1 to be the same value as the measured standard deviation for H0.

For example, IAP 142 then selects a false-alarm probability α, and a missed-alarm probability β, and performs a Sequential Probability Ratio Test (SPRT) as follows. Let:

$$a = \log\frac{\beta}{1-\alpha} \text{ and } b = \log\frac{1-\beta}{\alpha}$$

Further, in the context of this example, let $d_i$ be a new entropy value that is generated at time i, and, as such, let the probability ratio for the test be as follows:

$$\Lambda_i = \frac{P(d_i | H_1)}{P(d_i | H_0)}$$

where P(D|H) indicates the calculated probability of seeing data D, given that data D was generated from the probability distribution associated with hypothesis H.

In this example, IAP 142 calculates the cumulative sum of the log-likelihood ratio, log $\Lambda_i$, as new entropy values (for either a single group of devices or for multiple groups of devices of the same type) are generated as follows: with $S_0=0$, then, for $i=1,2,\ldots,$ $S_i=S_{i-1}+\log \Lambda_i$.

Alarms are then generated by IAP 142 based on a simple thresholding scheme:

a<$S_i$<b: continue monitoring, no alarm
$S_i \geq b$: Accept H1 "problem": alarm.
$S_i \leq a$: Accept H0 "all ok": no alarm.

Format of Published Alarm

According an embodiment, IAP 142 publishes an alarm by sending a message to an administrator email address with information about the alarm, including one or more of: the group of devices that triggered the alarm, what condition caused the alarm, historical information for the indicated group of devices, etc.

According to an embodiment, IAP 142 determines (and communicates in a published alarm) a level of the alarm based on any number of threshold values, where each threshold value defines a respective alarm level or based on the type of alarm condition that generated the alarm. To illustrate in the context of entropy deficit percentage values, a simple threshold alarm condition includes two threshold values: 50%, and 75%. Thus, if the entropy value is at least 50% but less than 75%, IAP 142 generates a medium-level alarm, and if the entropy value is 75% or over, IAP 142 generates a high-level alarm.

As a further illustration, a standard deviation threshold alarm condition includes two threshold values: mean+2×standard deviation; and mean+3×standard deviation. These standard deviation thresholds respectively define medium-level, and high-level alerts in a similar manner as described in connection with the multiple simple threshold illustration above.

According to an embodiment, IAP 142 published alarms by populating a graphical user interface (GUI) with depictions of the level of imbalance detected for groups of devices in the system. For example, IAP 142 causes color indicators depicted in a GUI near associated groups of devices to show a color that quickly communicates the alert level for the respective groups. When IAP 142 identifies a high-level alert for a given group of devices, IAP 142 at least makes the color indicator associated with the given group red. When IAP 142 identifies a medium-level alarm for a given group of devices, IAP 142 at least makes the color indicator associated with the given group amber. Also, when IAP 142 has not identified an alert for a given group of devices, IAP 142 at least makes the color indicator associated with the given group green in the GUI.

Breaking Ties in Device Statistics

In cases where the data points gathered for a group of devices are taken from a small number of alternatives, there is more likely to be ties among the data points for a given timestamp. Thus, according to an embodiment, IAP 142 implements a TieBreak function that breaks ties between data points for a group of devices gathered at the same timestamp by introducing pseudo-random values to the ranking determination of the data points.

To illustrate an example TieBreak function, both link 110 and link 112 are measured to have 8.0 Mbps throughput at the same timestamp. To break the tie, IAP 142 assigns a pseudorandom number that ranges from 0 to 1 to each of the tied devices and ranks the devices based on the assigned pseudorandom numbers. For example, at the same timestamp that links 110 and 112 were measured at 8.0 Mbps, link 114 has a throughput of 9.0 Mbps and link 116 has a throughput of 7.0 Mbps. To break the tie, IAP 142 assigns link 110 the pseudorandom number of 0.54356 and assigns link 112 the pseudorandom number of 0.98767. IAP 142 then ranks the links at the timestamp as follows: #1 link 114, #2 link 112, #3 link 110, #4 link 116. In this way, the rankings of tied links 110 and 112 at the timestamp are based on the pseudorandom numbers assigned thereto, and tied values will be broken differently at different times.

Consistent Rankings with Small Differences in Metric Values

Figure 5B:
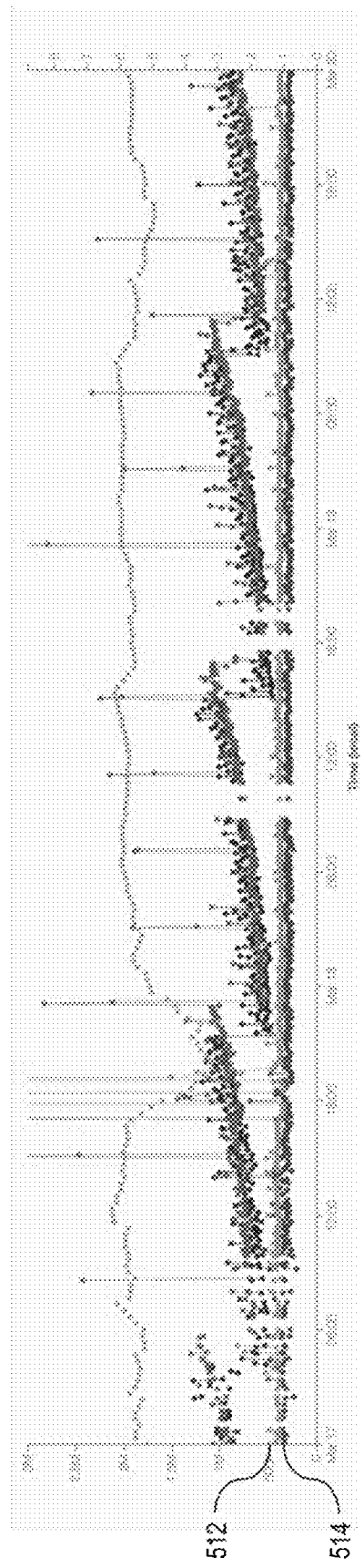

As indicated above, the ranking step strips the magnitudes of the collected statistics from the record of the statistics while preserving information indicating the relative dominance of the devices at each timestamp. At times, data points gathered for a particular device in a group of devices may be systematically bigger than another of the devices, but only by a small amount. For example, graph 510 of FIG. 5B depicts four time series charting data throughput values of four links, where time series 512 is systematically higher than time series 514 by a small amount. Based on systematic and consistent small differences in data points, IAP 142 generates the same entropy values as if there were a huge difference between the systematically different data points. Such a result is undesirable when device statistics that are not dramatically divergent are considered to be well-balanced even if one time series is systematically slightly higher than the other time series. In such cases, it is desirable to introduce some blur to the IAP imbalance calculation in order to even out the effect of such systematic small differences.

Thus, according to an embodiment, IAP 142 automatically detects when data points collected for a given group of devices at a given timestamp have values that are less than a blur parameter threshold in difference. When the values of two or more data points gathered for the device group are different by less than the blur parameter threshold, IAP 142 automatically introduces a pseudorandom number into the process of sorting the two or more data points into rankings in order to blur the differences between the data points.

For example, IAP 142 blurs the sorting results by adjusting the two or more data points to be the same value (e.g., the mean of the two or more data points) and then applying the TieBreak function to randomly break the manufactured tie. In this way, IAP 142 prevents small differences in balance statistics for a group of devices from affecting the determination of imbalance between the devices. In this embodiment, even if one of the devices in a group consistently has data points that are slightly above a second one of the devices in the group, the results of sorting the two devices into ranks does not show the first device consistently above the second device in the rankings, as would occur without the blur.

According to another embodiment, IAP 142 is configured with a blur value that indicates how much blur to consistently introduce to the imbalance calculation such that small systematic differences in data points of two or more devices in a given group of devices does not result in disproportionately high imbalance results. Specifically, IAP 142 quantizes the data points being gathered for the imbalance calculation at a particular timestamp by preserving only their most significant N bits, where N is a configurable blur value. IAP 142 performs quantization independently for every timestamp, since the values being gathered may vary together over a huge range. For example, network traffic can certainly vary by orders of magnitude at different times. Based on this form of blur, sampled statistics that are different based on a very small margin are likely to be quantized to be the same number. When quantization results in two or more gathered statistics having the same value, IAP 142 applies the Tie-Break function to the quantized values to randomly differentiate the values.

According to an embodiment, IAP 142 quantizes the values being gathered for the imbalance calculation by, independently for each timestamp, placing the values into N buckets, where the biggest value is placed in the top bucket, the smallest value in the bottom bucket, and the intermediate values in appropriate evenly-spaced intermediate buckets. Again, N is a configurable blur value.

For example, the blur value N is set to be four. IAP 142 detects that the throughput for links 110-116 are as follows: link 110 is 2.4567 Mbps; link 112 is 6.0192 Mbps; link 114 is 5.9345 Mbps; and link 116 is 3.4567 Mbps. Because N is four, IAP 142 determines the span of the largest throughput value and the smallest throughput value, which is 3.5625. IAP 142 divides the span value by N (i.e., four) to determine the bucket girth, which results in a bucket girth of 0.890625. Thus, bucket #1 get the values from 2.4567 to 3.347325; bucket #2 gets the values from 3.347326 to 4.237851; bucket #3 gets the values from 3.347326 to 5.128476; and bucket #4 gets the values from 5.128477 to 6.0192. Accordingly, the values for link 110 and link 116 are assigned to bucket #1, the values for link 112 and link 114 are assigned to bucket #4.

The devices that are assigned to the same bucket are taken to have the same value, and each of the multiple devices in a particular bucket is assigned a pseudorandom number with the same range (i.e., 0-1) on which to rank the devices in the bucket. Accordingly, IAP 142 randomly assigns link 110 a higher pseudorandom number than link 116, and also IAP 142 randomly assigns link 112 a higher pseudorandom number than link 114. In this example, the rankings of links 110-116 are as follows: #1 link 112; #2 link 114; #3 link 110; #4 link 116. Thus, quantizing values into buckets and then randomly ranking the devices in a given bucket introduces a configurable level of blur into the ranking process.

According to another embodiment, IAP 142 quantizes the values gathered for a group of devices at a given timestamp into a configurable number of buckets as described above. However, in this embodiment, IAP 142 does not evenly assign bucket girths. Before quantization, IAP 142 randomly perturbs the boundaries of the buckets, or selects bucket sizes randomly from an appropriate distribution of bucket sizes. Variable bucket sizes are configured to help avoid a pathological condition where a small systematic difference in values between data points gathered for two devices in a group places them always in different buckets, which reduces the effectiveness of the bucket-based blurring.

According to an embodiment, IAP 142 uses one of the blur techniques described above using gathered values that have been translated to a log scale. Of course, in order to translate negative statistical values to a log scale, an offset to make all values positive would first need to be added to the values.

According to an embodiment, IAP 142 blurs rankings of device statistics by adding random noise, from a specified distribution with a magnitude according to a configurable blur value, to the values gathered for a group of devices at a given timestamp. Adding random noise may be combined with another blur technique described above.

Architecture for Detecting Device Utilization Imbalances

FIG. 1 is a block diagram that depicts an example computing system 100 for detecting device utilization imbalances, according to one or more embodiments. Embodiments described above are implemented by one or more computing devices, such as computing device 140 of system 100. Example computing system 100 may include any kind of device, including switches, routers, computing devices, rack servers, etc., and may be used to detect device utilization imbalances for any one or more kinds of groups of devices as described herein.

Computing device 140 may be implemented by any type of computing device that is communicatively connected to LAN 104. Example implementations of computing device 140 include, without limitation, workstations, personal computers, laptop computers, and any other type of computing device.

In computing system 100, computing device 140 is configured with IAP 142. IAP 142 may be implemented in any number of ways, including as a stand-alone application running on computing device 140, as a plugin application to a browser running at computing device 140, etc. An application, such as embodiments of IAP 142 described herein, runs on a computing device and comprises a combination of software and allocation of resources from the computing device. Specifically, an application is a combination of integrated software components and an allocation of computational resources, such as memory, and/or processes on the computing device for executing the integrated software components on a processor, the combination of the software and computational resources being dedicated to performing the stated functions of the application.

LAN 104 may be implemented with any type of medium and/or mechanism that facilitates the exchange of information between computing devices. Furthermore, LAN 104 may facilitate use of any type of communications protocol, and may be secured or unsecured, depending upon the requirements of a particular embodiment.

In an embodiment, each of the techniques described in connection with IAP 142 are performed automatically and may be implemented using one or more computer programs, other software or hardware elements, and/or digital logic in any of a general-purpose computer or a special-purpose computer, while performing data retrieval, transformation, and storage operations that involve interacting with and transforming the physical state of memory of the computer.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 6:
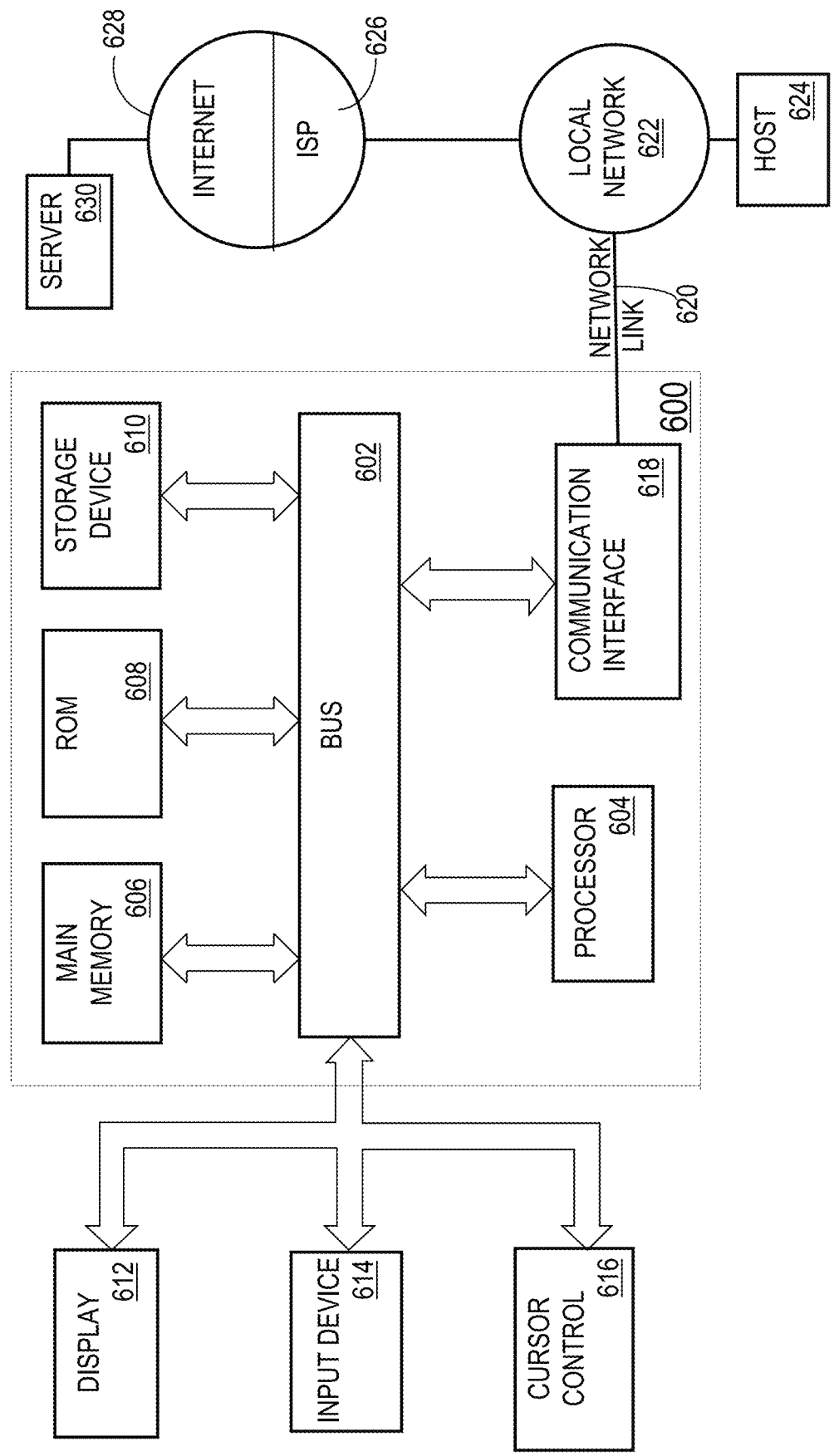
FIG. 6 is a block diagram of a computer system on which embodiments may be implemented.

For example, FIG. 6 is a block diagram that illustrates a computer system 600 upon which an embodiment of the invention may be implemented. Computer system 600 includes a bus 602 or other communication mechanism for communicating information, and a hardware processor 604 coupled with bus 602 for processing information. Hardware processor 604 may be, for example, a general purpose microprocessor.

Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Such instructions, when stored in non-transitory storage media accessible to processor 604, render computer system 600 into a special-purpose machine that is customized to perform the operations specified in the instructions.

Computer system 600 further includes a read only memory (ROM) 608 or other static storage device coupled to bus 602 for storing static information and instructions for processor 604. A storage device 610, such as a magnetic disk, optical disk, or solid-state drive is provided and coupled to bus 602 for storing information and instructions.

Computer system 600 may be coupled via bus 602 to a display 612, such as a cathode ray tube (CRT), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

Computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor 604 executing one or more sequences of one or more instructions contained in main memory 606. Such instructions may be read into main memory 606 from another storage medium, such as storage device 610. Execution of the sequences of instructions contained in main memory 606 causes processor 604 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 610. Volatile media includes dynamic memory, such as main memory 606. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 602. Transmission media can also take the form of acoustic or light waves, such as those generated during radio-wave and infra-red data communications.

Various forms of media may be involved in carrying one or more sequences of one or more instructions to processor 604 for execution. For example, the instructions may initially be carried on a magnetic disk or solid-state drive of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card, cable modem, satellite modem, or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are example forms of transmission media.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618.

The received code may be executed by processor 604 as it is received, and/or stored in storage device 610, or other non-volatile storage for later execution.

Software Overview

Figure 7:
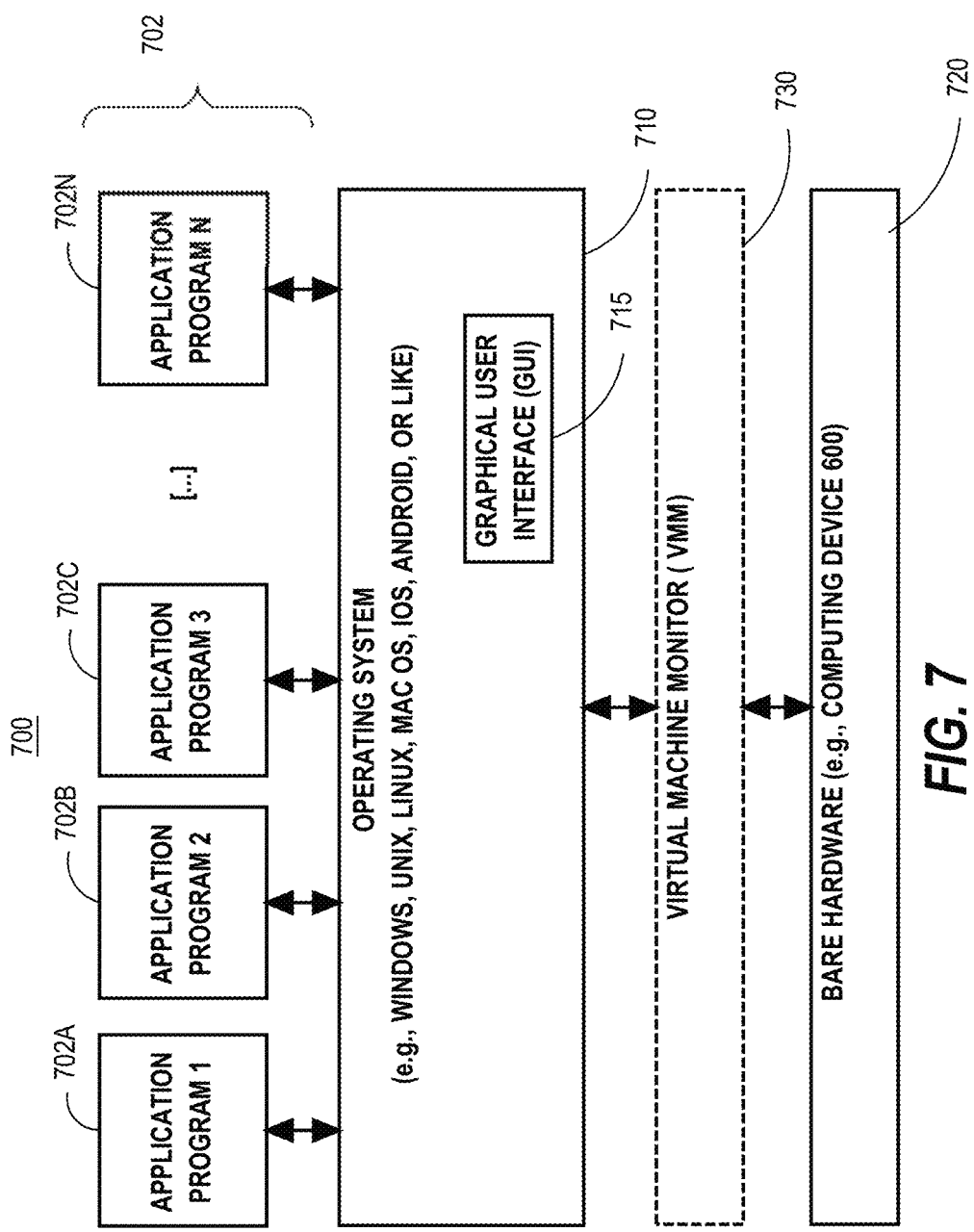
FIG. 7 is a block diagram of a basic software system that may be employed for controlling the operation of a computer system.

FIG. 7 is a block diagram of a basic software system 700 that may be employed for controlling the operation of computer system 600. Software system 700 and its components, including their connections, relationships, and functions, is meant to be exemplary only, and not meant to limit implementations of the example embodiment(s). Other software systems suitable for implementing the example embodiment(s) may have different components, including components with different connections, relationships, and functions.

Software system 700 is provided for directing the operation of computer system 600. Software system 700, which may be stored in system memory (RAM) 606 and on fixed storage (e.g., hard disk or flash memory) 610, includes a kernel or operating system (OS) 710.

The OS 710 manages low-level aspects of computer operation, including managing execution of processes, memory allocation, file input and output (I/O), and device I/O. One or more application programs, represented as 702A, 702B, 702C . . . 702N, may be "loaded" (e.g., transferred from fixed storage 610 into memory 606) for execution by the system 700. The applications or other software intended for use on computer system 600 may also be stored as a set of downloadable computer-executable instructions, for example, for downloading and installation from an Internet location (e.g., a Web server, an app store, or other online service).

Software system 700 includes a graphical user interface (GUI) 715, for receiving user commands and data in a graphical (e.g., "point-and-click" or "touch gesture") fashion. These inputs, in turn, may be acted upon by the system 700 in accordance with instructions from operating system 710 and/or application(s) 702. The GUI 715 also serves to display the results of operation from the OS 710 and application(s) 702, whereupon the user may supply additional inputs or terminate the session (e.g., log off).

OS 710 can execute directly on the bare hardware 720 (e.g., processor(s) 604) of computer system 600. Alternatively, a hypervisor or virtual machine monitor (VMM) 730 may be interposed between the bare hardware 720 and the OS 710. In this configuration, VMM 730 acts as a software "cushion" or virtualization layer between the OS 710 and the bare hardware 720 of the computer system 600.

VMM 730 instantiates and runs one or more virtual machine instances ("guest machines"). Each guest machine comprises a "guest" operating system, such as OS 710, and one or more applications, such as application(s) 702, designed to execute on the guest operating system. The VMM 730 presents the guest operating systems with a virtual operating platform and manages the execution of the guest operating systems.

In some instances, the VMM 730 may allow a guest operating system to run as if it is running on the bare hardware 720 of computer system 600 directly. In these instances, the same version of the guest operating system configured to execute on the bare hardware 720 directly may also execute on VMM 730 without modification or reconfiguration. In other words, VMM 730 may provide full hardware and CPU virtualization to a guest operating system in some instances.

In other instances, a guest operating system may be specially designed or configured to execute on VMM 730 for efficiency. In these instances, the guest operating system is "aware" that it executes on a virtual machine monitor. In other words, VMM 730 may provide para-virtualization to a guest operating system in some instances.

A computer system process comprises an allotment of hardware processor time, and an allotment of memory (physical and/or virtual), the allotment of memory being for storing instructions executed by the hardware processor, for storing data generated by the hardware processor executing the instructions, and/or for storing the hardware processor state (e.g. content of registers) between allotments of the hardware processor time when the computer system process is not running. Computer system processes run under the control of an operating system, and may run under the control of other programs being executed on the computer system.

Cloud Computing

The term "cloud computing" is generally used herein to describe a computing model which enables on-demand access to a shared pool of computing resources, such as computer networks, servers, software applications, and services, and which allows for rapid provisioning and release of resources with minimal management effort or service provider interaction.

A cloud computing environment (sometimes referred to as a cloud environment, or a cloud) can be implemented in a variety of different ways to best suit different requirements. For example, in a public cloud environment, the underlying computing infrastructure is owned by an organization that makes its cloud services available to other organizations or to the general public. In contrast, a private cloud environment is generally intended solely for use by, or within, a single organization. A community cloud is intended to be shared by several organizations within a community; while a hybrid cloud comprises two or more types of cloud (e.g., private, community, or public) that are bound together by data and application portability.

Generally, a cloud computing model enables some of those responsibilities which previously may have been provided by an organization's own information technology department, to instead be delivered as service layers within a cloud environment, for use by consumers (either within or external to the organization, according to the cloud's public/private nature). Depending on the particular implementation, the precise definition of components or features provided by or within each cloud service layer can vary, but common examples include: Software as a Service (SaaS), in which consumers use software applications that are running upon a cloud infrastructure, while a SaaS provider manages or controls the underlying cloud infrastructure and applications. Platform as a Service (PaaS), in which consumers can use software programming languages and development tools supported by a PaaS provider to develop, deploy, and otherwise control their own applications, while the PaaS provider manages or controls other aspects of the cloud environment (i.e., everything below the run-time execution environment). Infrastructure as a Service (IaaS), in which consumers can deploy and run arbitrary software applications, and/or provision processing, storage, networks, and other fundamental computing resources, while an IaaS provider manages or controls the underlying physical cloud infrastructure (i.e., everything below the operating system layer). Database as a Service (DBaaS) in which consumers use a database server or Database Management System that is running upon a cloud infrastructure, while a DbaaS provider manages or controls the underlying cloud infrastructure, applications, and servers, including one or more database servers.

The above-described basic computer hardware and software and cloud computing environment presented for purpose of illustrating the basic underlying computer components that may be employed for implementing the example embodiment(s). The example embodiment(s), however, are not necessarily limited to any particular computing environment or computing device configuration. Instead, the example embodiment(s) may be implemented in any type of system architecture or processing environment that one skilled in the art, in light of this disclosure, would understand as capable of supporting the features and functions of the example embodiment(s) presented herein.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A computer-executed method comprising:
    at each timestamp of a plurality of timestamps within a particular timeframe:
        recording a set of data points of a particular device metric measuring usage of a computer resource to be balanced among a plurality of devices using said computer resource,
        wherein the set of data points includes a respective data point for each respective device of the plurality of devices, and
        ranking the set of data points, wherein said ranking assigns, to each data point of the set of data points, a rank that is based on a value of the particular device metric for said each data point relative to values of the particular device metric for the other data points in the set of data points;
    determining a count of times one or more data points for each device, of the plurality of devices, is found at a given rank at each timestamp of the plurality of timestamps within the particular timeframe;
    based on a relative number of times the one or more data points for each device, of the plurality of devices, is found at a given rank at each timestamp of the plurality of timestamps within the particular timeframe, determining an entropy value that reflects a balance of usage of the computer resource by the plurality of devices; and
    determining whether the entropy value satisfies an imbalance condition;
    based on determining that the entropy value satisfies the imbalance condition, a computing device publishing alert information that comprises one or more of:
        information identifying the plurality of devices,
        information indicating a condition that caused said publishing the alert information,
        historical information for the plurality of devices, or
        an alarm level;
    wherein the method is performed by one or more computing devices that comprise the computing device.

2. The method of claim 1, wherein:
    the imbalance condition is based on one of: the entropy value exceeding a threshold, or the entropy value not exceeding a threshold;
    the threshold is of one of: a simple threshold, a standard deviation threshold, or a probability threshold.

3. The method of claim 1, wherein:
    each device of the plurality of devices is a network link device that transmits data;
    the particular device statistic is a measure of data throughput.

4. The method of claim 1, further comprising, at each timestamp of the plurality of timestamps, storing, in a data store, information that records the rank of each device of the plurality of devices at said each timestamp.

5. The method of claim 1, wherein:
    ranking a particular set of data points comprises assigning, to each data point of the particular set of data points, a respective rank of a plurality of ranks;
    a number of the plurality of ranks is the number of data points in the particular set of data points; and
    determining the entropy value that reflects the balance of usage of the computer resource by the plurality of devices comprises:
        determining a device-specific entropy value for each device, of the plurality of devices, at each rank of the plurality of ranks;
        wherein the entropy value is based on a sum of the device-specific entropy values for each device at each rank of the plurality of ranks.

6. The method of claim 5, wherein the entropy value is one of: a total entropy value, an entropy deficit value, an entropy percentage value, an entropy deficit percentage value, a normalized entropy value, or a normalized entropy deficit value.

7. The method of claim 1, further comprising, prior to ranking the set of data points:
    determining that at least two data points of the set of data points have the same value for the particular device metric;
    in response to determining that at least two data points of the set of data points have the same value for the particular device metric, assigning each of the at least two data points of the set of data points a respective pseudorandom number;
    wherein the set of data points are ranked based, at least in part, on the assigned pseudorandom numbers.

8. The method of claim 1, further comprising, prior to ranking the set of data points:
    determining that two data points of the set of data points have a difference, in particular device metric value, of less than a particular threshold;
    in response to determining that the two data points of the set of data points have a difference of less than the particular threshold, assigning each of the two data points a respective pseudorandom number;
    wherein the set of data points are ranked based, at least in part, on the assigned pseudorandom numbers.

9. The method of claim 1, wherein ranking a particular set of data points comprises:
    assigning each data point, of the particular set of data points, to a bucket of a plurality of buckets based on the value of said each data point being within a range of values associated with the bucket; and sorting two or more data points, of the particular set of data points, assigned to the same bucket of the plurality of buckets based, at least in part, on one or more pseudorandom numbers.

10. The method of claim 9, wherein each bucket, of the plurality of buckets, is associated with a randomized range of values.

11. The method of claim 1, further comprising:
for each timestamp of the plurality of timestamps, storing identifiers of each device, of the plurality of devices, in order of rank;
wherein the identifiers are stored as sets of bits;
wherein said determining the count of times one or more data points for each device, of the plurality of devices, is found at a given rank at each timestamp of the plurality of timestamps within the particular timeframe is based, at least in part, on the stored identifiers.

12. One or more non-transitory computer-readable media storing instructions that, when executed by one or more processors, cause:
at each timestamp of a plurality of timestamps within a particular timeframe:
recording a set of data points of a particular device metric measuring usage of a computer resource to be balanced among a plurality of devices using said computer resource,
wherein the set of data points includes a respective data point for each respective device of the plurality of devices, and
ranking the set of data points, wherein said ranking assigns, to each data point of the set of data points, a rank that is based on a value of the particular device metric for said each data point relative to values of the particular device metric for the other data points in the set of data points;
determining a count of times one or more data points for each device, of the plurality of devices, is found at a given rank at each timestamp of the plurality of timestamps within the particular timeframe;
based on a relative number of times the one or more data points for each device, of the plurality of devices, is found at a given rank at each timestamp of the plurality of timestamps within the particular timeframe, determining an entropy value that reflects a balance of usage of the computer resource by the plurality of devices; and
determining whether the entropy value satisfies an imbalance condition;
based on determining that the entropy value satisfies the imbalance condition, a computing device publishing alert information that comprises one or more of:
information identifying the plurality of devices,
information indicating a condition that caused said publishing the alert information,
historical information for the plurality of devices, or
an alarm level.

13. The one or more non-transitory computer-readable media of claim 12, wherein:
the imbalance condition is based on one of:
the entropy value exceeding a threshold, or
the entropy value not exceeding a threshold;
the threshold is of one of: a simple threshold, a standard deviation threshold, or a probability threshold.

14. The one or more non-transitory computer-readable meida of claim 11, wherein:
each device of the plurality of devices is a network link device that transmits data;

the particular device statistic is a measure of data throughput.

15. The one or more non-transitory computer-readable media of claim 12, wherein the instructions further comprise instructions that, when executed by one or more processors, cause, at each timestamp of the plurality of timestamps, storing, in a data store, information that records the rank of each device of the plurality of devices at said each timestamp.

16. The one or more non-transitory computer-readable media of claim 12, wherein:
ranking a particular set of data points comprises assigning, to each data point of the particular set of data points, a respective rank of a plurality of ranks;
a number of the plurality of ranks is the number of data points in the particular set of data points; and
determining the entropy value that reflects the balance of usage of the computer resource by the plurality of devices comprises:
determining a device-specific entropy value for each device, of the plurality of devices, at each rank of the plurality of ranks;
wherein the entropy value is based on a sum of the device-specific entropy values for each device at each rank of the plurality of ranks.

17. The one or more non-transitory computer-readable media of claim 16, wherein the entropy value is one of: a total entropy value, an entropy deficit value, an entropy percentage value, an entropy deficit percentage value, a normalized entropy value, or a normalized entropy deficit value.

18. The one or more non-transitory computer-readable media of claim 12, wherein the instructions further comprise instructions that, when executed by one or more processors, cause, prior to ranking the set of data points:
determining that at least two data points of the set of data points have the same value for the particular device metric;
in response to determining that at least two data points of the set of data points have the same value for the particular device metric, assigning each of the at least two data points of the set of data points a respective pseudorandom number;
wherein the set of data points are ranked based, at least in part, on the assigned pseudorandom numbers.

19. The one or more non-transitory computer-readable media of claim 12, wherein the instructions further comprise instructions that, when executed by one or more processors, cause, prior to ranking the set of data points:
determining that two original data points of the set of data points have a difference, in particular device metric value, of less than a particular threshold;
in response to determining that the two data points of the set of data points have a difference of less than the particular threshold, assigning each of the two data points a respective pseudorandom number;
wherein the set of data points are ranked based, at least in part, on the assigned pseudorandom numbers.

20. The one or more non-transitory computer-readable media of claim 12, wherein ranking a particular set of data points comprises:
assigning each data point, of the particular set of data points, to a bucket of a plurality of buckets based on the value of said each data point being within a range of values associated with the bucket; and sorting two or more data points, of the particular set of data points, assigned to the same bucket of the plurality of buckets based, at least in part, on one or more pseudorandom numbers.

21. The one or more non-transitory computer-readable media of claim 20, wherein each bucket, of the plurality of buckets, is associated with a randomized range of values.

22. The one or more non-transitory computer-readable media of claim 12, wherein the instructions further comprise instructions that, when executed by one or more processors, cause:

for each timestamp of the plurality of timestamps, storing identifiers of each device, of the plurality of devices, in order of rank;
wherein the identifiers are stored as sets of bits;
wherein said determining the count of times one or more data points for each device, of the plurality of devices, is found at a given rank at each timestamp of the plurality of timestamps within the particular timeframe is based, at least in part, on the stored identifiers.

* * * * *